(12) United States Patent
Lee

(10) Patent No.: US 8,045,405 B2
(45) Date of Patent: Oct. 25, 2011

(54) MEMORY SYSTEM, MEMORY DEVICE AND COMMAND PROTOCOL

(75) Inventor: Jung-Bae Lee, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1132 days.

(21) Appl. No.: 11/779,349

(22) Filed: Jul. 18, 2007

(65) Prior Publication Data

US 2008/0184002 A1 Jul. 31, 2008

(30) Foreign Application Priority Data

Jan. 31, 2007 (KR) .................. 10-2007-0009954

(51) Int. Cl.
*G11C 29/00* (2006.01)
*G11C 7/00* (2006.01)

(52) U.S. Cl. ....................... 365/191; 714/773
(58) Field of Classification Search .......... 365/191; 714/773
See application file for complete search history.

(56) References Cited

U.S. PATENT DOCUMENTS

| | | | | |
|---|---|---|---|---|
| 4,309,754 A | * | 1/1982 | Dinwiddie, Jr. ............... | 710/307 |
| 5,006,980 A | * | 4/1991 | Sanders et al. ................ | 712/219 |
| 5,053,990 A | * | 10/1991 | Kreifels et al. ............... | 711/103 |
| 5,134,616 A | | 7/1992 | Barth, Jr. et al. | |
| 5,361,228 A | * | 11/1994 | Adachi et al. ............ | 365/189.03 |
| 5,438,535 A | * | 8/1995 | Lattibeaudiere ........... | 365/49.17 |
| 5,471,430 A | * | 11/1995 | Sawada et al. ................ | 365/222 |
| 5,564,020 A | * | 10/1996 | Rossi ............................ | 398/115 |
| 5,663,901 A | * | 9/1997 | Wallace et al. ................ | 365/52 |
| 5,673,222 A | * | 9/1997 | Fukumoto et al. ........ | 365/185.04 |
| 5,790,813 A | * | 8/1998 | Whittaker ..................... | 710/113 |
| 6,000,004 A | * | 12/1999 | Fukumoto ..................... | 711/103 |
| 6,246,626 B1 | * | 6/2001 | Roohparvar .................. | 365/226 |
| 6,301,150 B1 | * | 10/2001 | Kanamitsu et al. ....... | 365/185.03 |
| 6,307,779 B1 | * | 10/2001 | Roohparvar ............. | 365/185.11 |
| 6,314,049 B1 | * | 11/2001 | Roohparvar ............. | 365/233.1 |
| 6,438,068 B1 | * | 8/2002 | Roohparvar ............. | 365/238.5 |
| 6,459,617 B1 | * | 10/2002 | Roohparvar ............. | 365/185.11 |
| 6,496,444 B2 | * | 12/2002 | Roohparvar ............. | 365/189.15 |
| 6,560,161 B1 | * | 5/2003 | Zitlaw et al. ............. | 365/230.06 |
| 6,580,659 B1 | * | 6/2003 | Roohparvar ................. | 365/236 |
| 6,606,269 B2 | * | 8/2003 | Roohparvar ............. | 365/185.33 |
| 6,654,313 B2 | * | 11/2003 | Roohparvar ............. | 365/233.17 |
| 6,657,899 B2 | * | 12/2003 | Roohparvar ............. | 365/185.33 |

(Continued)

FOREIGN PATENT DOCUMENTS

CN 1722078 A 1/2006
(Continued)

OTHER PUBLICATIONS

Office Action Corresponding to Chinese Patent Application No. 200810003823.4 Issued Mar. 16, 2011.

*Primary Examiner* — Joseph D Torres
(74) *Attorney, Agent, or Firm* — Volentine & Whitt, PLLC

(57) ABSTRACT

A memory system, memory, and memory system command protocol are disclosed. Within the memory system, a memory controller communicates a command to the memory, the command being selected from a set of commands including a write command and a plurality of non-write commands. A Hamming distance value calculated between a digital value indicating the write command and a digital value indicating any one of the plurality of non-write commands is greater than 1.

32 Claims, 14 Drawing Sheets

| | ACT | PRE | WR | RE | REF |
|---|---|---|---|---|---|
| /CS | 0 | 0 | 0 | 0 | 0 |
| /RAS | 0 | 0 | 1 | 1 | 0 |
| /CAS | 1 | 1 | 0 | 0 | 0 |
| /WE | 1 | 0 | 0 | 1 | 1 |
| /AWE | 1 | 1 | 0 | 1 | 1 |
| H.D | 4 | 3 | | 2 | 3 |

U.S. PATENT DOCUMENTS

| | | | |
|---|---|---|---|
| 6,691,204 B1* | 2/2004 | Roohparvar | 711/103 |
| 6,711,054 B2* | 3/2004 | Kanamitsu et al. | 365/185.03 |
| 6,728,161 B1* | 4/2004 | Roohparvar | 365/233.1 |
| 6,728,798 B1* | 4/2004 | Roohparvar | 710/35 |
| 6,731,011 B2* | 5/2004 | Verma et al. | 257/777 |
| 6,760,274 B2* | 7/2004 | Roohparvar | 365/236 |
| 6,785,764 B1* | 8/2004 | Roohparvar | 711/103 |
| 6,870,774 B2* | 3/2005 | Roohparvar et al. | 365/185.33 |
| 6,892,270 B2* | 5/2005 | Roohparvar | 711/105 |
| 6,959,365 B2* | 10/2005 | Ootani et al. | 711/152 |
| 6,999,376 B2* | 2/2006 | Roohparvar | 365/189.15 |
| 7,042,768 B2* | 5/2006 | Roohparvar et al. | 365/185.33 |
| 7,043,611 B2* | 5/2006 | McClannahan et al. | 711/154 |
| 7,096,283 B2* | 8/2006 | Roohparvar | 710/14 |
| 7,161,870 B2* | 1/2007 | Zitlaw et al. | 365/230.06 |
| 7,236,407 B2* | 6/2007 | Roohparvar et al. | 365/185.33 |
| 7,251,711 B2* | 7/2007 | Roohparvar | 711/154 |
| 7,305,514 B2* | 12/2007 | Roohparvar | 711/103 |
| 7,471,559 B2* | 12/2008 | Shibata | 365/185.03 |
| 7,533,191 B2* | 5/2009 | Dunstan | 710/3 |
| 7,600,068 B2* | 10/2009 | Chalopin et al. | 710/311 |
| 7,603,534 B2* | 10/2009 | Roohparvar | 711/168 |
| 7,680,966 B1* | 3/2010 | Falik et al. | 710/45 |
| 2002/0006074 A1* | 1/2002 | Roohparvar | 365/233 |
| 2004/0015922 A1 | 1/2004 | Kitakami et al. | |
| 2004/0054840 A1* | 3/2004 | Berg et al. | 710/306 |
| 2004/0199715 A1 | 10/2004 | Ellis et al. | |
| 2008/0181030 A1* | 7/2008 | Lee | 365/191 |

FOREIGN PATENT DOCUMENTS

| | | |
|---|---|---|
| JP | 2004152378 | 5/2004 |

* cited by examiner

FIG. 3
(PRIOR ART)

Memory System Commands

|      | ACT | PRE | WR | RE | REF |
|------|-----|-----|----|----|-----|
| /CS  | 0   | 0   | 0  | 0  | 0   |
| /RAS | 0   | 0   | 1  | 1  | 0   |
| /CAS | 1   | 1   | 0  | 0  | 0   |
| /WE  | 1   | 0   | 0  | 1  | 1   |
| H.D  | 3   | 2   |    | 1  | 2   |

Control Signals

FIG. 5B
(PRIOR ART)

|      | ACT | PRE | WR | RE | REF |
|------|-----|-----|----|----|-----|
| /CS  | 0   | 0   | 0  | 0  | 0   |
| /RAS | 0   | 0   | 1  | 1  | 0   |
| /CAS | 1   | 1   | 0  | 0  | 0   |
| /WE  | 1   | 0   | 0  | 1  | 1   |
| H.D  | 3   | 2   |    | 1  | 2   |

FIG. 7B

|      | ACT | PRE | WR | RE | REF |
|------|-----|-----|----|----|-----|
| /CS  | 0   | 0   | 0  | 0  | 0   |
| /RAS | 0   | 0   | 1  | 1  | 0   |
| /CAS | 1   | 1   | 0  | 0  | 0   |
| /WE  | 1   | 0   | 0  | 1  | 1   |
| /AWE | 1   | 1   | 0  | 1  | 1   |
| H.D  | 4   | 3   |    | 2  | 3   |

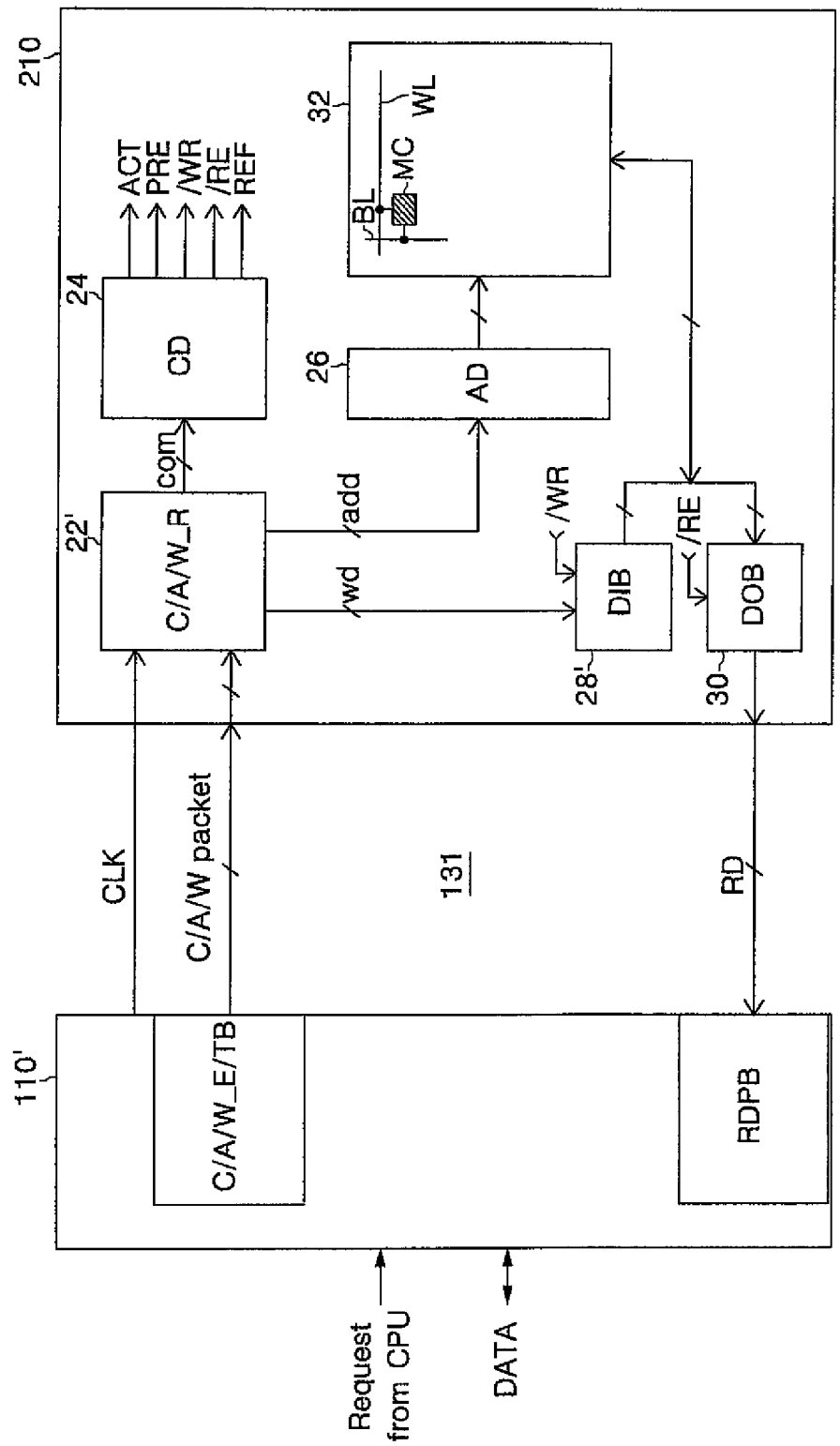

FIG. 9A

| | 0 | 1 | 2 | 3 | 4 | 5 | 6 | 7 |
|---|---|---|---|---|---|---|---|---|
| 0 | DC=0 | R1 | R7 | X | X | C2 | C8 | X |
| 1 | /CS | R2 | R8 | X | X | C3 | C9 | X |
| 2 | /RAS | R3 | R9 | X | X | C4 | C10 | X |
| 3 | /CAS | R4 | R10 | X | /AWE | C5 | C11 | X |
| 4 | /WE | R5 | R11 | X | C0 | C6 | C12 | X |
| 5 | R0 | R6 | R12 | X | C1 | C7 | X | X |

MEMORY SYSTEM, MEMORY DEVICE AND COMMAND PROTOCOL

CROSS REFERENCE TO RELATED APPLICATION

This application claims priority to Korean Patent Application No. 10-2007-0009954 filed Jan. 31, 2007, the subject matter of which is hereby incorporated by reference.

BACKGROUND OF THE INVENTION

1. Field of the Invention

The invention relates generally to memory systems, memories, and command protocols for memory systems.

2. Description of Related Art

The concept of a "memory system" now encompasses a great variety of circuits and related control methods and protocols enabling the transfer, storage and retrieval of digital data. Once memory systems were associated with only computers systems and similar computational logic platforms. Now, a great host of consumer products ranging from cell phones to automobiles to refrigerators include memory systems of varying degrees of complexity.

A generic memory system is conceptually illustrated in Figure (FIG.) 1, wherein a memory 2 stores data received from a memory controller 1 via a channel 3.

As defined by its application, memory 2 may be volatile or nonvolatile in its operating nature. A volatile memory retains stored data only so long as power is applied to the memory. Dynamic Random Access Memories (DRAMs) and Static Random Access Memories (SRAMs) are well known examples of volatile memories. In contrast, nonvolatile memories have the ability to retain stored data in the absence of applied power. NAND and NOR type flash memories are examples of nonvolatile memories.

Regardless of memory type and related storage capabilities, a memory must typically be associated with some kind of memory controller. Memory controller 1 shown in FIG. 1 may take many different forms including a generic processor or controller, a dedicated memory controller, a direct memory address (DMA) controller, a host central processor unit (CPU), a dedicated data switch, or similar transfer element, etc. In each of its varied forms and regardless of additional functionality, the basic functionality ascribed to a memory controller 1 is one of controlling the transfer of data to and/or from memory 2.

Data transfer between memory controller 1 and memory 2 is accomplished via a channel 3. Channel 3 may be hardwired or wireless in its implementation. For example, data may be wirelessly transferred between memory controller 1 and memory 2 via radio frequency (RF) channel(s), infrared channel(s) and/or electromagnetic channel(s). More typically, memory controller 1 and memory 2 are connected via a hardwired channel formed by one or more buses and/or various signal lines. In this context, a "bus" is merely a collection (physical or operational) of signal lines commonly operated in relation to a block of data and/or a data transfer period.

The examples shown in FIG. 2 are but several of numerous types of hardwire channels 3 that might be used to connect memory 2 and memory controller 1. In the first illustrated example, memory 2 and memory controller 1 are connected by a plurality of unidirectional control signal lines (C/S), a unidirectional address bus (ADDR), and a bidirectional data bus (DQ). Assuming for purposes of illustration that memory 2 is a DRAM, the control signal lines may be used to communicate commonly used control signals such as chip select (CS), row address strobe (RAS), column address strobe (CAS), write enable (WE), etc. With this configuration, the address bus may be used to communicate multiple address bits identifying unique location(s) in memory 2 to/from which data is to be written/read, respectively. Data written to memory 2 will hereafter be referred to a "write data" and data retrieved from memory 2 will be referred to as "read data."

In the second illustrated example of FIG. 2, the unidirectional collection of control signal lines and the address bus are effectively combined into a single control/address (C/A) bus. This bus configuration is commonly associated with memory systems transferring packetized data. That is, certain memory system architectures utilize the flexibility and efficiency afforded by configuring data into packets prior to communication. The definition and use of data packets are well understood by those skilled in the art and are the subject of many conventional protocols and standards.

In the third illustrated example of FIG. 2, the common unidirectional C/A bus illustrated in the second example is also used to communicate write data from memory controller 1 to memory 2. Here again, the write data may be grouped into one or more data packet(s) along with related control data and/or address data.

Finally, in the fourth illustrated example of FIG. 2, a common bidirectional bus is used to communicate not only control data, address data and write data from memory controller 2 to memory 1, but also read data from memory 2 to memory controller 1. Only certain dedicated control signal lines are otherwise defined between memory controller 1 and memory 2 outside the common bidirectional bus. In this example, read data may be packetized before being communicated it from memory 2 to memory controller 1.

Regardless of the specific nature of channel 3, the transfer of data between memory controller 1 and memory 2 is made in relation to a defined protocol. A "protocol" is a system of rules that defines how something is to be accomplished. Thus, is the context of a memory system, a protocol is an agreed-upon or standardized "language" for communicating data and/or establishing a communications connection between a memory and some other device, such as a memory controller. Many memory system protocols are implemented, in whole or it part, according to industry standards. Other protocols are custom in their definition and use. In some instances, one protocol may be used to call (or invoke) another protocol.

One notable characteristic of conventional and emerging memory systems is an increasing demand for greater data bandwidth (available data per unit operation) and/or data throughput (available data per unit of time). Data bandwidth may be increased by increasing the number of data bits communicated to/from a memory per unit memory system operation (e.g., read and write operations). Data throughput may be increased by increasing the number of data bits communicated per unit memory system operation, and/or by increasing the speed with which each memory system operation is performed.

Given the concurrent commercial motivations of reducing memory system size and power consumption while maximizing available data bandwidth and data throughput, it is not surprising that certain practical limitations and resource conflicts have been identified. For example, the number of signal lines connecting a memory controller with a memory may be limited by the size of the memory or memory controller, and/or the corresponding number of available connection (input/output) pads. Given such physical limitations, all or some of the signal lines forming a channel in a memory system may be multiplexed in their use.

Regardless of the physical connections between a memory and memory controller and the controlling communications protocol, almost all contemporary memory systems are being run at increasingly fast clock speeds. Increasingly fast clock speeds facilitate greater data throughput, and enhanced data throughput is a highly desirable characteristic in many commercial applications.

Unfortunately, increasingly fast clock speeds also increase the likelihood of data communication (transmission and/or reception) errors. Indeed, system complexity has become so great and data transfer speeds so fast, that many contemporary memory systems now incorporate error detection and/or error correction (hereafter, singularly or collectively indicated as "EDC") capabilities designed to mitigate the inevitable consequences of data communication errors.

EDC capabilities were once used primarily for long-haul (or bulk) data traffic such as telephone networks and satellite communication systems. Now, however, the advantages of incorporating EDC capabilities within a memory system are well appreciated. There are many different types of EDC protocols, techniques, schemes, and related circuits and software. One class of relatively simple error detection techniques are conventionally used to implement a functionality referred to as a cyclic redundancy checker (CRC). More sophisticated EDC techniques are capable of not only detecting the presence of one or more error(s) in communicated data, but also of correcting the detected error(s).

Nearly all EDC techniques are implemented by adding additional ("overhead") data bits to a block of data being communicated. That is, the data block is first run through a mathematical or logical calculation in order to produce corresponding EDC data. The EDC data is then transferred along with the data block. At the receiving end, the data block is again run through a similar mathematical/logical calculation and the resulting data compared to the received EDC data. A successful comparison indicates an error free block of data. A failed comparison indicates one or more errors in the data block. When more sophisticated EDC techniques are used, these error(s) may be corrected by further resort to the EDC data.

EDC capabilities are particularly beneficial in the context of memory systems transferring data in packet form. That is, individual data packets may be defined to include corresponding EDC data along with other types of data (e.g., control data, address data, write data, etc.). The EDC data may be associated with (e.g., derived from and used to detect and/or correct errors in) any one or more of these other data types contained in the data packet.

While EDC capabilities offer great benefits in the verification of data being communicated between a memory controller and a memory, such capabilities come at a price. The greatest price is typically imposed on the overall operating speed of the memory system. EDC operations run in the memory controller, and more particularly, EDC operations run in the memory potentially generate a data throughput bottleneck in the memory system. Thus, the contemporary memory system designer faces the competing demands of (1) increasing data bandwidth/throughput which require the streamlining, simplifying, and expediting of memory system operations, and (2) assuring data integrity which requires sophisticated and relatively slow EDC operations.

SUMMARY OF THE INVENTION

In recognition of the competing demands placed upon memory system designers, embodiments of the invention provide a memory system command protocol that offers improved immunity to communication errors. This is particularly true in the context of "write commands." In one aspect, the improved immunity of memory system commands within embodiments of the invention allows a reduction in the sophistication of EDC capabilities incorporated within the memory system, or the completion omission of EDC capabilities from the memory system. Alternately, given a defined set of EDC capabilities within a memory system, a command protocol consistent with embodiments of the invention results in a significant reduction in the likelihood of command misinterpretation and erroneous execution in an associated memory. As a further result, data integrity is assured and memory system reliability improved.

In one embodiment, the invention provides a memory system comprising; a memory controller communicating a command to a memory, the command being selected from a set of commands comprising a write command and a plurality of non-write commands, wherein a Hamming distance value calculated between a digital value indicating the write command and a digital value indicating any one of the plurality of non-write commands is greater than 1.

In a related embodiment, each command in the set of commands may be uniquely indicated by command data and the command data indicating the write command may comprise a plurality of write enable bits.

In another embodiment, the invention provides a memory system comprising; a memory controller connected to a plurality of memory elements arranged on a memory card via a plurality of point-to-point interfaces, the memory controller communicating a command to at least one memory associated with at least one of the plurality of memory elements, the command being selected from a set of commands comprising a write command and a plurality of non-write commands, wherein a Hamming distance value between the write command and each one of the plurality of non-write commands is greater than 1.

In a related embodiment, the plurality of memory elements may comprise a stacked arrangement of memories including the memory, wherein a lowermost memory in the stacked arrangement re-drives the command to at least one other memory in the stacked arrangement of memories.

In another embodiment, the invention provides a method of controlling operation of a memory, the method comprising; selecting a command from a set of commands, the set of commands comprising a write command and a plurality of non-write commands, and communicating the selected command to the memory, wherein a Hamming distance value calculated between a digital value indicating the write command and a digital value indicating any one of the multiple non-write commands is greater than 1.

In another embodiment, the invention provides a protocol operative within a memory system, comprising; defining unique digital values for each one of a set of commands, wherein the set of commands comprises a write command and a plurality of non-write commands, and wherein a Hamming distance value calculated between a digital value indicating the write command and a digital value indicating any one of the plurality of non-write commands is greater than 1.

BRIEF DESCRIPTION OF THE DRAWINGS

Embodiments of the invention are described in relation to the accompanying drawings. Throughout the drawings and written description like reference numbers indicate like exemplary elements, components, and steps. In the drawings:

FIG. 3 is an exemplary table of conventional command data indicating a plurality of memory system commands;

FIG. 5B is an exemplary command table for the conventional memory system of FIG. 4;

FIG. 7B is an exemplary command table for the memory system of FIG. 6;

FIG. 8 Illustrates a memory system operating in accordance with a memory system command protocol consistent with another embodiment of the invention;

FIGS. 9A and 9B illustrate an exemplary command packets for the memory system of FIG. 8;

DESCRIPTION OF EXEMPLARY EMBODIMENTS

Figure 1:
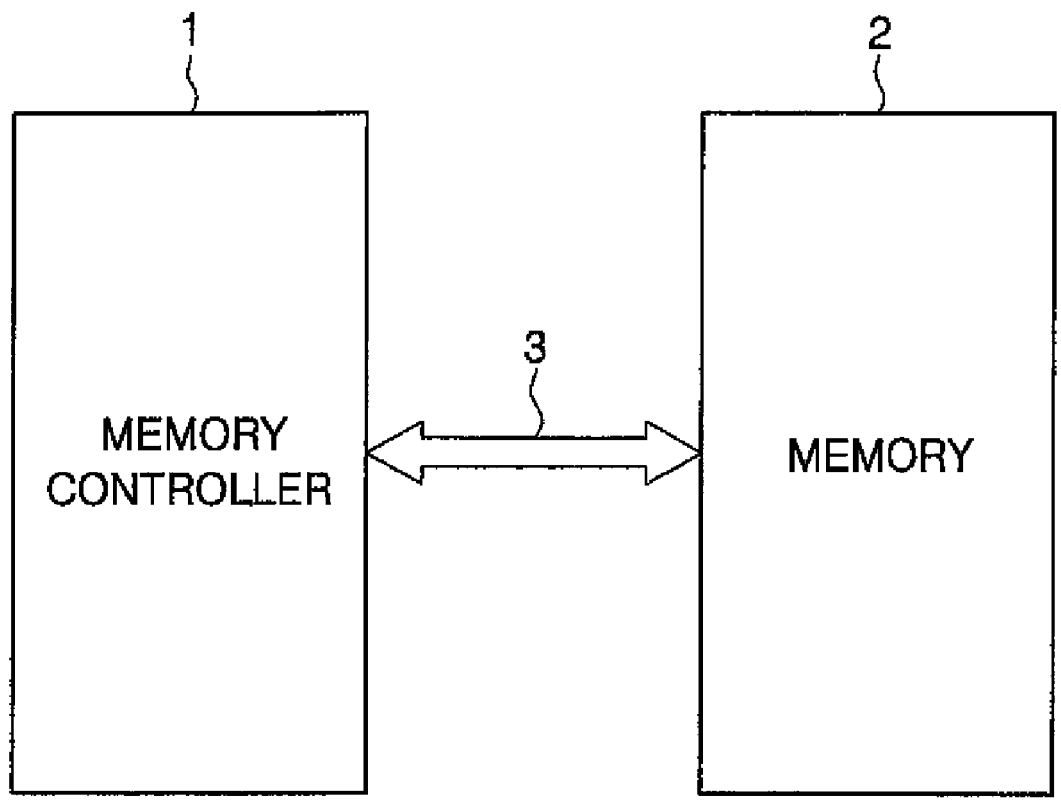
FIG. 1 is a block diagram of a conventional memory system.
Figure 2:
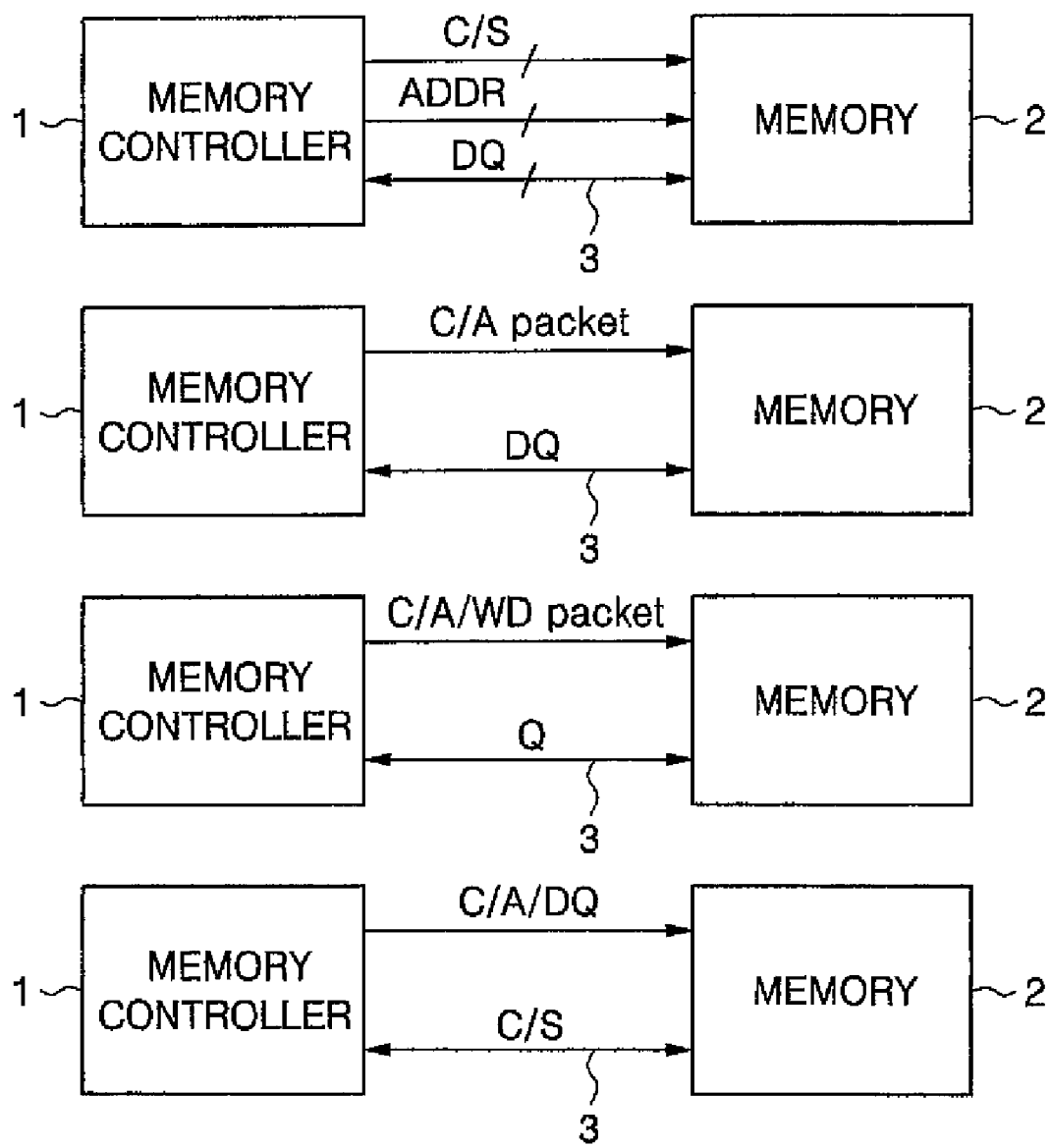
FIG. 2 is a collection of further examples of conventional memory systems and possible channel connections between a memory controller and memory.

Embodiments of the invention will now be described with reference to the accompanying drawings. The invention may, however, be alternately and variously embodied and is not limited to only the illustrated embodiments. Rather, the illustrated embodiments are presented as teaching examples. The actual scope of the invention is defined by the claims that follow.

In one aspect, embodiments of the invention address the possible effect of data communication errors on memory system commands. Such commands may be communicated by discrete control signals, by data contained in a data packet, or other conventional means.

Many conventional memory systems sequentially execute commands only after finishing a corresponding EDC operation. When EDC data is communicated from a memory controller to a memory in relation to a command, an EDC operation must typically be performed to verify the accuracy of the data associated with the command (e.g., control data, address data, etc.) before the command can be executed in the memory. This sequential execution of the EDC operation followed by execution of the command operation ensures that the data received in relation to the command is accurate before the command is actually executed.

This straight-forward, sequential approach to command data verification followed by execution of the command ensures accuracy. It is also likely to create a command execution bottleneck in the memory. For example, if transient noise is apparent on a channel connecting the memory controller and memory, a group of commands sequentially received by the memory may include noise-induced data errors. The EDC operations necessarily used in a conventional memory system to identify and/or correct these errors may be relatively lengthy in their respective or cumulative execution. As a result, data throughput in the conventional memory system may be markedly reduced.

Against this backdrop, embodiments of the invention recognize practical execution distinctions between certain types of memory system operations. For example, embodiments of the invention recognize a clear distinction between "write operations" and "non-write operations." For purposes of this description, a "write operation" is any operation that has the intended capability of altering one or more data value(s) in memory. This definition is broader than the phrase "write operation" used in the context of conventional RAM devices, for example. It also includes the program/write operations used in the context of conventional flash memory devices. Clearly, these types of conventionally understood operations—which are specifically ascribed to the alteration of data stored in memory—are subsumed within the working definition of the term "write operation." However, other operations are also included within this definition. For example, erase operations performed in many kinds of nonvolatile memories are also intentionally capable of altering one or more data value(s) in memory, and as such, fall within the working definition of a write operation.

In contrast, other memory system operations, hereafter individually and collectively referred to as "non-write operations," are not intentionally capable of altering one or more data value(s) in memory. Conventional read operations applied to both volatile and nonvolatile memories are examples of a non-write operation, since their execution is not intended to alter any data value stored in memory. So too, refresh operations applied to conventional DRAM devices are another example of a non-write operation, as are conventional chip select operations, etc.

In the description that follows, each operation, whether a write operation or a non-write operation, is assumed to be associated with one or more commands communicated from a memory controller to a memory. Some operations in certain memory systems may be executed in response to a single command indicated by a unitary block of command data. Other operations may be executed in response to multiple commands indicated over a sequence or collection of data blocks containing related command data. For purposes of clarity throughout this description, such distinctions in the execution details of various commands will not be further referenced, and each memory system operation will be said to be performed in response to "a command", recognizing that said command may be indicated using many different data configurations and/or data transmission timing characteristics. Thus, in view of the foregoing, a write operation will be said to be executed in a memory in response to a "write command," and a non-write operation will be said to be executed in a memory in response to a "non-write command."

Commands and data associated with commands may be variously "communicated" within the context of embodiments of the invention between a memory controller and a memory. Such communication may be wireless and/or hardwired in its nature. Both standard and customized data communication protocols are contemplated by embodiments of the invention.

Commands and related memory system data (e.g., address data, write data, read data, etc.) may be communicated between a memory controller and a memory in a data packet or in some other non-packet form (i.e., using conventional serial or parallel data communication techniques). Data packets may be variously defined in their structure and communication timing. Embodiments of the invention contemplate both standard and customize data packet definitions. Thus, while certain embodiments of the invention have particular application and benefit to memory systems using packetized data, the subject invention is not limited to only such systems.

Commands, whether packetized or un-packetized, must be "decoded" within a memory before (or as part of) being executed using memory-based resources (e.g., hardware and/or software resources available to the memory). Packet decoding is a well understood concept. Since one common purpose for packetizing data is the multiplexing of corresponding signals lines, some partitioning and subsequent decoding of the data bits contained in a data packet are typically required. However, the term "decoding" as used in this description has a broader definition and subsumes all forms of digital data and/or analog signal manipulation, interpretation, and/or conversion.

In many instances, memory system data and/or signals may be identified as internal verses external for purposes of description. Terms like internal data, internal address, internal command, etc., indicate data operable or meaningful within a memory of the memory system. For example, in practical applications, memory controllers manufactured by a number of vendors may be used in memory systems in conjunction with memories manufactured by different vendors. It is common for various memory controller commands to be "decoded" into internal commands executable within a memory. Sometimes the format and definition of external and internal commands, or external and internal data may be identical. However, some decoding, conversion or interpretation of a command or data received from a memory controller may be performed by a memory. This is also true of certain control signals, such as clock signals. However, data/clock timing conversions, data type conversions, signal level conversions, command interpretations and decoding, etc. between the memory controller and memory are deemed to be conventional in their nature and are assumed to vary with memory system design.

Once a command and any related data has been received in memory, successfully identified by decoding, and verified by an applied EDC operation (if required), it may be executed using hardware and/or software resources in memory. The actual execution of commands in a particular memory system is a matter of design choice and is also deemed conventional for purposes of this description.

In the illustrated embodiments that follow, a generic memory core is indicated as a primary hardware resource for storing data. While DRAM examples have been selected to illustrate various embodiments of the invention, those of ordinary skill in the art will recognize that other memory types might be used, such as a SRAM, or a flash (NAND or NOR) memory. For the sake of clarity, conventional memory core operations will be assumed in order to avoid repetition of extraneous and conventionally understood detail related to the actual mechanisms whereby data storage (writing or programming) and data retrieval (reading) are accomplished. Thus, row and column addressing techniques, applied word line and bit line voltages, applied sequences of data operations, applied sequences of signal line and control signals, etc., will vary with the specific type and design of particular memory cores.

Embodiments of the invention also recognize that memory cores are commonly associated with a number of related circuits, such as decoders, voltage generators, redundant memory circuits, etc. These conventionally associated peripheral circuits are largely omitted from the illustrated embodiments that follow, since their design, use, and incorporation are deemed to be conventionally understood.

In recognition of the distinct operating implications between write operations and non-write operations, embodiments of the invention variously relate to a command protocol, as well as a memory within a memory system using the command protocol. In one embodiment, a command protocol designed in accordance with the dictates of the present invention further recognizes that erroneously communicated (and/or erroneously interpreted) write operations have a particularly high likelihood of causing major operating difficulties within a memory system. For example, where one or more data bits indicating a non-write command is changed during communication due to channel noise effects, the resulting collection of received data bits may actually be interpreted by the memory as a write command. Where such an erroneously indicated write operation is executed, critical data stored in memory may be overwritten and lost. In contrast, the erroneous interpretation and execution of a non-write command, while annoying in its delay upon overall memory system operations, is nonetheless unlikely to result in the corruption of stored data.

The pernicious effects of an errant write operation being executed in a memory system is one of the drivers motivating incorporation of EDC capabilities within memory systems. As noted above, EDC capabilities incorporated within a memory system may vary in their complexity, sophistication, and application. But regardless of the nature and sophistication of an EDC capability, it imposes material costs (operating speed, layout space, system complexity, etc.) on the design and operation of a memory system. Such costs tend to escalate with increasingly sophistication of the EDC capability. Thus, in so far as the simplicity and operating efficiency of an EDC capability can be increased, the easier and less costly its incorporation will be within a memory system. Ideally, a memory system would be sufficiently insulated from data communication errors such that no EDC capability would be required. However, in many memory system applications this ideal is unlikely to be met in the near future.

In view of the foregoing, the table of exemplary memory system commands shown in FIG. 3 will be considered. This fairly simple example assumes a DRAM type memory responsive to conventional commands such as active (ACT), precharge (PRE), write (WR), read (RE), refresh (REF), etc., received from a memory controller. Other types of memory, such as nonvolatile memories like NAND and NOR flash memories might alternately be considered in the context of the present invention. These other types of memories will certainly have different command sets, but all commands in their constituent command sets may be rationally divided into one or more "write commands" respectively initiating a write operation, and one or more "non-write commands" respectively initiating a non-write operation.

However, in the example of FIG. 3, the set of exemplary memory system commands are respectively indicated by multi-bit command data derived from a plurality of control signals (e.g., chip select (/CS), row address strobe (/RAS), column address strobe (/CAS), and write enable (/WE)). Thus, each command is indicated by unique command data (i.e., a unique combination of 1's and 0's provided by the logical levels of the applied control signals). In the illustrated example, the read command (RE) is indicated by command data of "0101", and write command (WR) is indicated by command data of "0100". Thus, only the logic state of a single bit (i.e., the $4^{th}$ bit in the sequence of command data) distinguishes the read command (RE) from the write command (WR) in the context of the illustrated embodiment. Should only the $4^{th}$ bit be changed (inverted) during communication of the intended read command (RE), the memory receiving the errant command data will interpret it as indicating a write command (WR), and will thereafter execute an erroneous write command.

The possibility of this type of errantly communicated and/or erroneously interpreted command happening may be expressed mathematically by a calculated value known as a "Hamming distance value." The last row of the table shown in FIG. 3 indicates the respective Hamming distance values calculated between the write command (WR) and the other non-write commands in the illustrated set of commands. More particularly, the respective Hamming distance values are calculated between digital values used to indicate the respective memory system commands.

A Hamming distance value may be calculated in one approach by performing an exclusive-OR (XOR) operation on two digital values expressed on two strings of binary data (i.e., strings of binary command data indicating the respective memory system commands). As is well understood by those skilled in the art, an XOR operation may be implemented by simply adding the corresponding bits of the two data strings using a binary add operation without carry. This type of operation effectively identifies a number of corresponding bits between the two data strings that have different values. Consider the following example in which six (6) of the corresponding bit pairs between Data Strings "A" and "B" have different logic values. The calculated Hamming distance value (H) for this example is therefore six (6).

| | |
|---|---|
| Data String "A" | 0 1 0 0 1 0 1 0 0 0 |
| Data String "B" | 1 1 0 1 0 1 0 1 0 0 |
| ("A" XOR "B") | 1 0 0 1 1 1 1 1 0 0. |

In similar fashion, the Hamming distance value between the active command (ACT) and the write command (WR) in the example of FIG. 3 may be calculated as three (3). By comparison, the Hamming distance value between the read command (RE) and the write command (WR) is only one (1). A Hamming distance value of one (1) indicates that a single erroneously communicated data bit may change an intended read command into an errantly indicated write command, the execution of which may corrupt data stored in the memory. Similar examples might be identified for command sets associated with other types of memory systems (e.g., flash memory systems) where a non-write command within the set of commands may be erroneously communicated as a write command (e.g., a program/write command or an erase command).

Defining a memory system command protocol that increases the Hamming distance value between each write command and all non-write commands has the effect of establishing an interpretation/execution guard band of sorts around the write command(s). In other words, each increment in the Hamming distance value calculated between each write command and all non-write commands has the effect of increasing (by a squared factor, $N^2$) the possibility of the non-write command being errantly communicated and/or erroneously interpreted as a write command.

Thus, using the example command set shown in FIG. 3 for convenience, it is assumed that the statistical probability (P) of the $4^{th}$ bit (i.e., write enable control signal) being errantly communicated as a "0" instead of a "1" during communication of a read command (RE), and therefore being erroneously interpreted as write command is equal to 0.0001 or P=0.0001, (one in ten thousand). By increasing the Hamming distance value calculated between these two commands, or more particularly, calculated between the strings of binary command data indicating the respective commands, from "1" to "2", the probability of the read command being errantly communicated and/or erroneously interpreted as the write command rises to $(0.0001)^2$ or P=0.00000001, (one in one hundred million).

A memory system command protocol defining each write command as having a minimal Hamming distance value greater than 1 may be adapted for use in all kinds of memory systems. However, for purposes of illustration several exemplary memory systems will now be described. A comparative conventional memory system will first be described with reference to FIGS. 4, 5A and 5B. With this conventional example in mind, an embodiment of the invention will then be described in relation to FIGS. 6, 7A and 7B. Then another embodiment of the invention will be described in relation to FIGS. 8, 9A and 9B.

Figure 4:
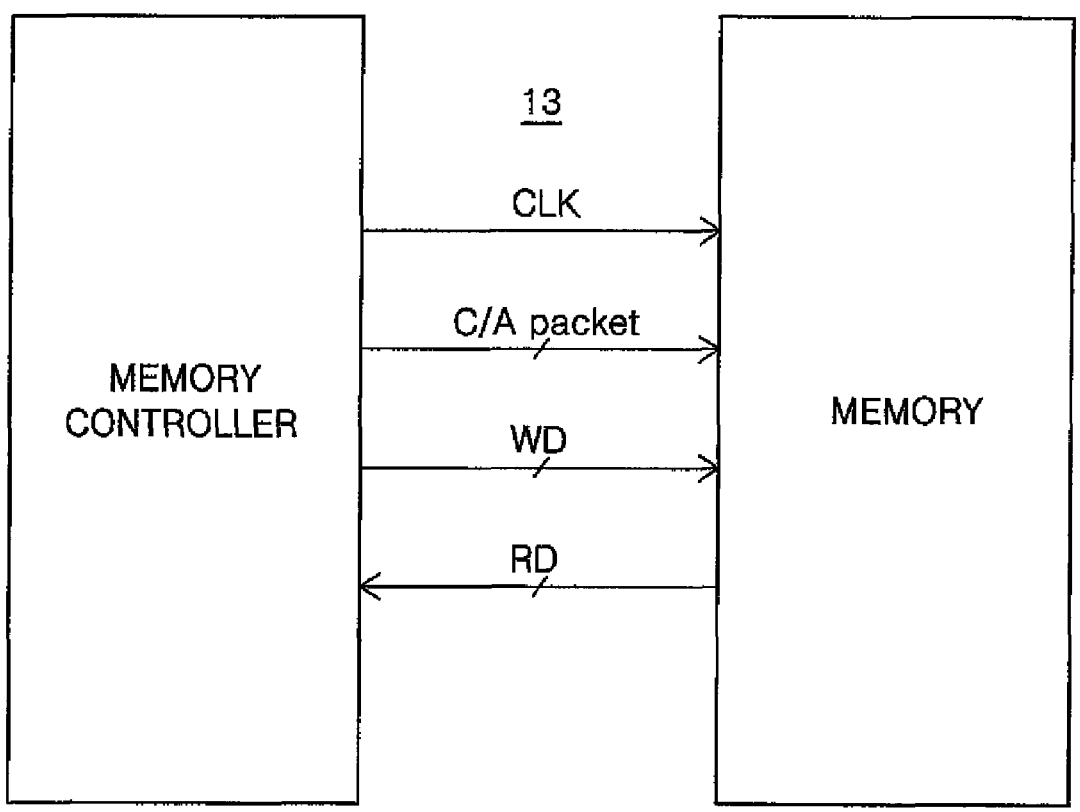
FIG. 4 illustrates a conventional memory system running a conventional memory system command protocol.

The conventional memory system illustrated in FIG. 4 comprises a memory controller 10 connected to a memory 20 via a channel 13. Memory controller 10, as suggested above, may take one of numerous possible conventional forms. Memory 20 is assumed in the illustrated example of FIG. 4 to be a DRAM. The memory system of FIG. 4 is further assumed to communicate data between memory controller 10 and memory 20 using data packets. Channel 13 comprises a clock signal line communicating an external clock signal developed by memory controller 10 to memory 20; a command/address (C/A) packet bus communicating one or more packets including command data indicating one or more memory system command(s) and address data indicating a corresponding address or set of addresses in memory 20; a write data bus (WD) communicating write data from memory controller 10 to memory 20; and, a read data bus (RD) communicating read data from memory 20 to memory controller 10.

Figure 5A:
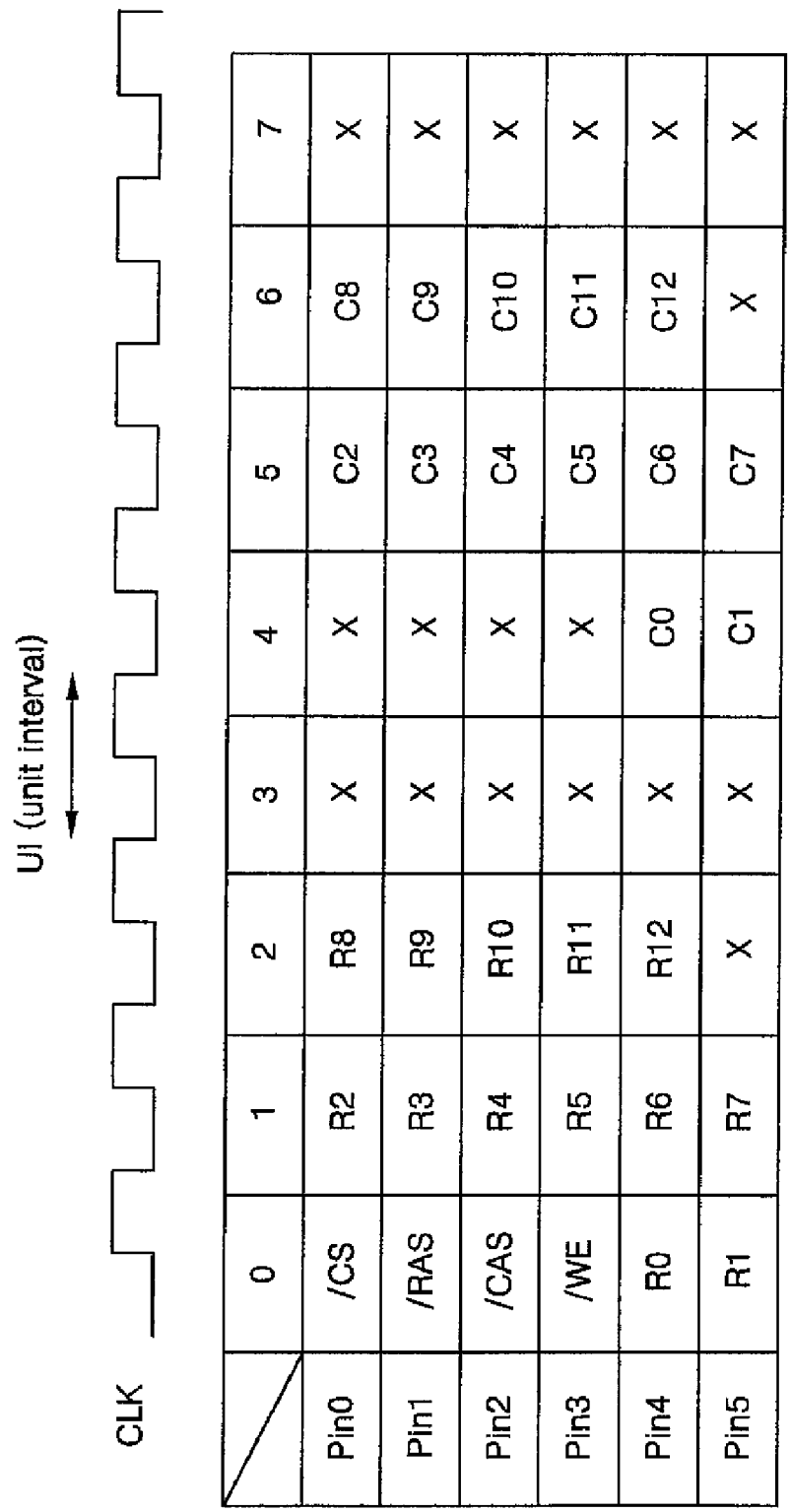
FIG. 5A illustrates an exemplary command packet for a conventional memory system of FIG. 4.

The external clock generated by memory controller 10 may be used to define uniform timing intervals during which data packets are communicated between memory controller 10 to memory 20. FIG. 5A illustrates an exemplary data packet including command data (e.g., /CS, /RAS, /CAS, and /WE), address data (e.g., row address data R0-R12 and column address data C0-C12), and certain don't care bits ("X").

Each of the comparative memory system embodiments presented herein might further incorporate EDC capabilities. If this were the case, the constituent command/address packets would also include EDC data. However, the illustrated memory system examples described herein are assumed to not include EDC capabilities for purposes of descriptive clarity. Those of ordinary skill in the art will recognize, however, that this need not be the case, and that memory systems (packetized and non-packetized) incorporating all manner of EDC capabilities may benefit from use of a memory system command protocol according to embodiments of the invention. Additional examples of memory systems incorporating EDC capabilities and likely benefiting from a memory command protocol according to the invention may be found in commonly assigned U.S. patent application Ser. No. 11/779, 345 filed concurrently with the subject application, the subject matter of which is hereby incorporated by reference.

Returning to FIGS. 4 and 5A, the model data packet of FIG. 5A may be communicated over an interval of eight (8) unit intervals via six (6) signal lines forming the C/A packet bus. When decoded in memory 20, the four (4) bits of command data (/CS, /RAS, /CAS, and /WE) indicate one command from a set of possible commands. Five (5) exemplary commands (e.g., chip activate (ACT), precharge (PRE), write (WR), read (RE), and refresh (REF)) are illustrated in the table of FIG. 5B. As before, the assumed conventional memory system uses a protocol which allows write command(s) to have a Hamming distance value of one (1). (See, last row of the table in FIG. 5B—write command (WR) in view of read command (RE)).

Figure 6:
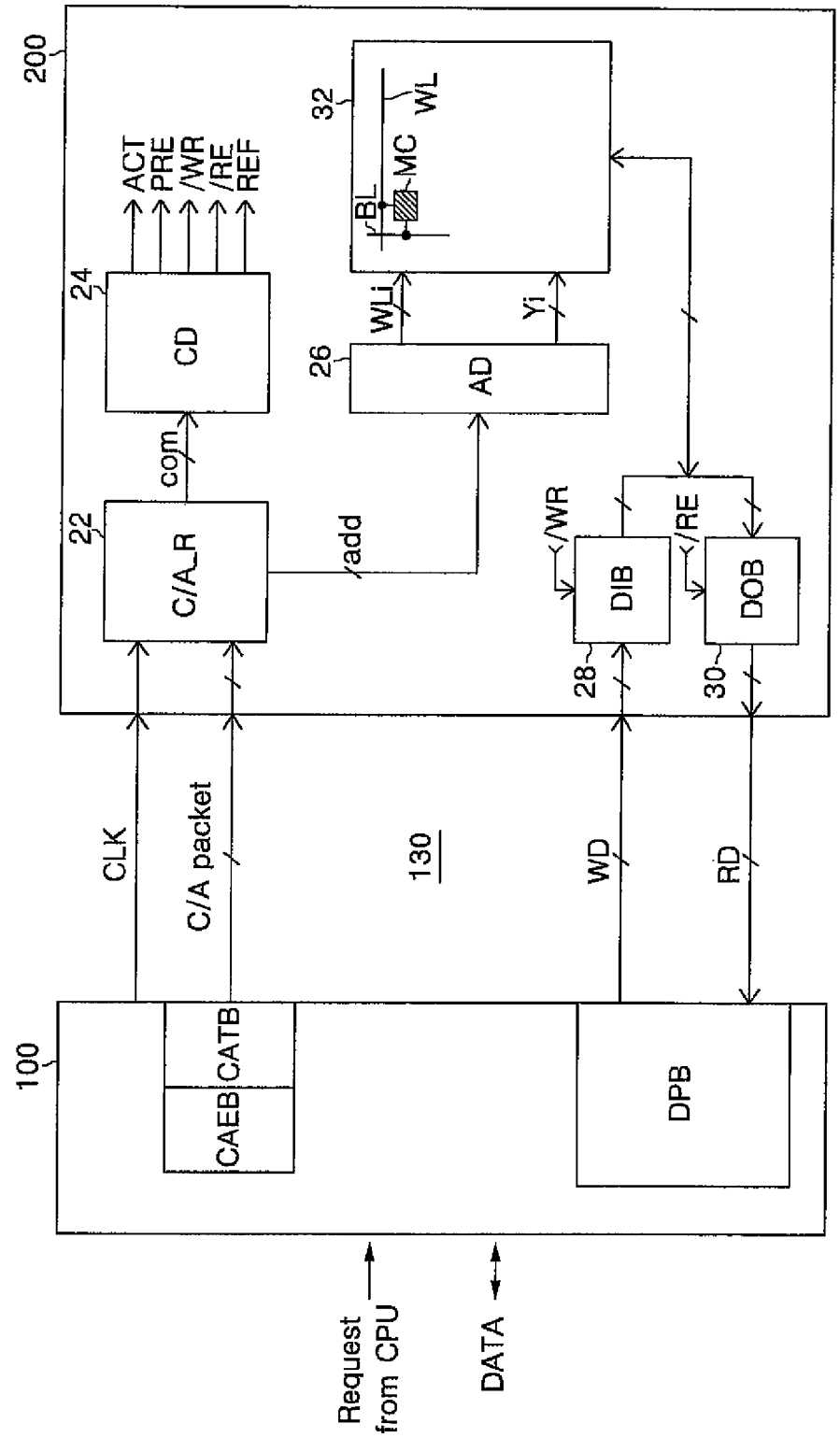
FIG. 6 illustrates a memory system operating in accordance with a memory system command protocol consistent with an embodiment of the invention.

The exemplary embodiment of the invention illustrated in FIG. 6 makes many of the same design assumptions as the conventional example of FIG. 4. For example it is assumed to be a DRAM based memory system using packets to communicate data between memory controller 100 and memory 200 via a channel 130.

In the illustrated example, memory controller 100 receives various requests from a host device CPU as well as related data. In response, memory controller 100 generates an external clock signal, a command/address (C/A) packet and, as required, write data. The command data and address data forming the C/A packet may be generated in a C/A encoding block (CAEP). Thereafter, a C/A transmission block (CATP) places the resulting C/A packet on the C/A bus of channel 130. The write data when needed is generated by a data processing block (DPP) and communicated via a write data bus (WD) to memory 200. Each of these constituent memory controller components may be implemented using conventional designs, and may be operated according to conventional techniques, except as otherwise required below.

At memory 200, the received C/A packet may be decoded by a C/A receiver 22 (C/A_R) into an internal command (com) and an internal address (add) in relation to the external clock signal or an internal clock signal derived from the external clock signal. The internal command (com) is applied to a command decoder 24 (CD) where it is decoded to produce one or more internal command signals applied to a memory core 32. The internal address (add) is applied to an address decoder 26 (AD) which in turn generates row and/or column address voltages applied to select specific memory cell(s) MC in memory core 32. The operation of memory core 32, the decoding of the internal command and internal address, as well as the generation and application of internal command signals, row and column address signals, word and bit line voltages, etc., may all be conventionally implemented.

Memory 200 also includes a data input buffer 28 receiving write data from the write data bus (WD) and thereafter communicating the write data to memory core 32 in response to a write enable signal (/WR) and a data output buffer 30 receiving read data from memory core 32 and thereafter communicating the write data to memory controller 100 in response to a read enable signal (/RE).

Within the exemplary memory system of FIG. 6, however, a protocol consistent with an embodiment of the invention may be implemented. For example, consider the exemplary command/address packet of FIG. 7A which is analogous to the command/packet of FIG. 5A, except that an additional write enable bit (/AWE) is provided. Thus, instead of four (4) bits of command data per the packet of FIG. 5A, the command/address packet of FIG. 7A includes five (5) bits of command data, with the additional write enable bit (/AWE) replacing one of the "don't care" bits in the packet.

Figure 7A:
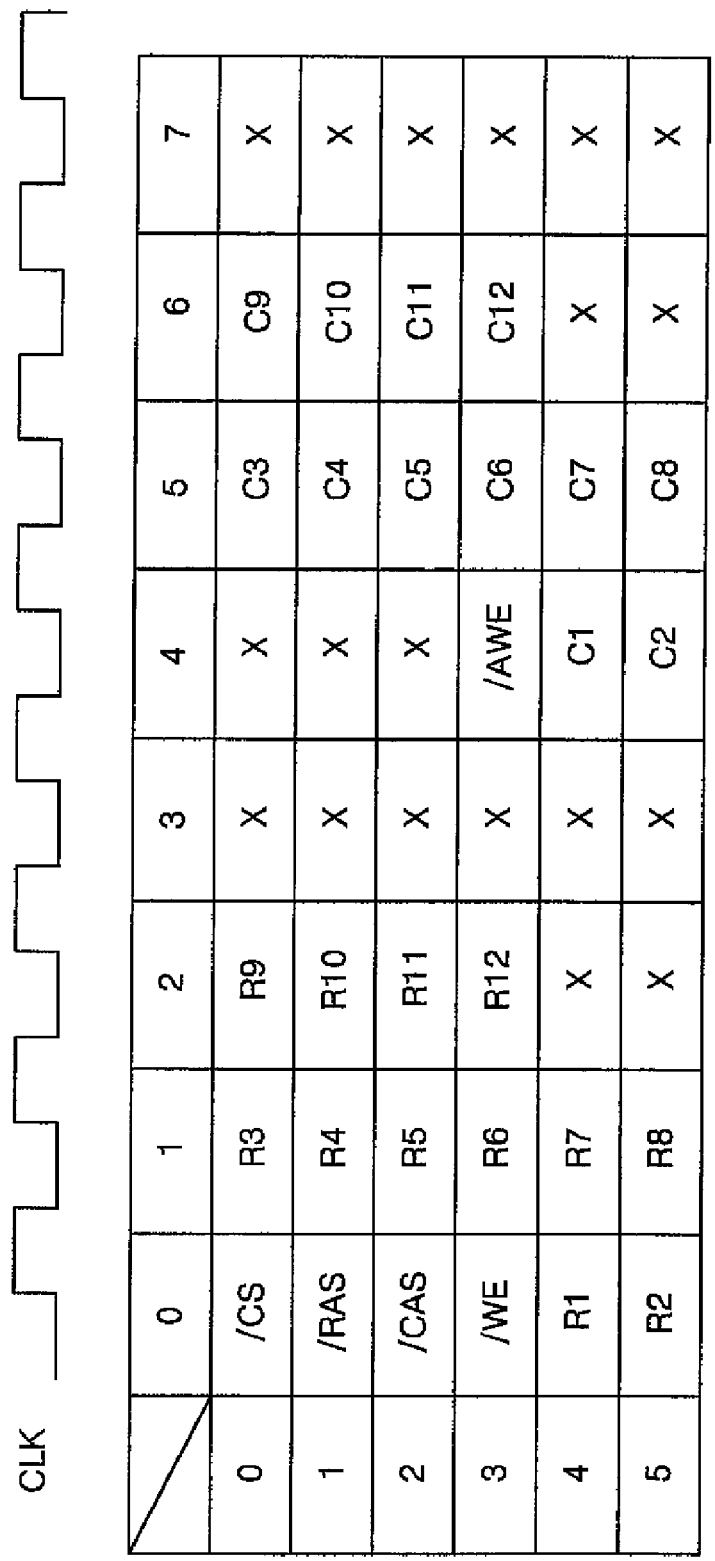
FIG. 7A illustrates an exemplary command packet for the memory system of FIG. 6.

The same five (5) memory system commands (e.g., ACT, PRE, WR, RE and REF) indicated by the data packet of FIG. 5A may be indicated by the data packet of FIG. 7A. However, the provision of an additional write enable bit (/AWE) uniquely indicating one or more write command(s) within the set of possible memory system command results in a very different set of corresponding Hamming distance values. With reference to the last row of FIG. 7B, the minimum Hamming distance value between the write command (WR) and each one of the non-write commands is now greater than 1. As a result, the possibility of the read command (RE) being errantly communicated and/or erroneously interpreted as the write command (WR) is greatly reduced (i.e., by a factor of $P^2$, where P is the probability of only the original write enable bit being reversed during communication of the read command).

The embodiment illustrated in FIG. 8 is similar to the embodiment illustrated in FIG. 6 and like components and functionality will not be reiterated. Rather, focusing on the differences, memory controller 110' combines the functionality of the write data processing block portion of the data processing block shown in FIG. 6 into the command/address encoding and transmission blocks to provide a command/address/write data encoding and transmitting block (C/A/W_E/TB). This component generates one or more data packets containing control data, address data and write data to be communicated via a single C/A/W bus. The read data retuned by memory 210 in response to a command is communicated via the read data bus (RD).

Once the one or more C/A/W packets are received in a C/A/W receiver 22' (C/A/W_R) and decoded into one or more internal commands (com), an internal address, and internal write data (wd). The internal write data (wd) is applied to write data input buffer 28' in response to a write enable signal /WR provided by command decoder 24.

With this particular channel configuration 131 including a single C/A/W bus communicating command, address, and write data, it may be necessary to communicate this block of data in multiple data packets. For example, if we assumed the same channel resources and time frame considerations assumed for the memory systems of FIGS. 4 and 6, and thereby assume a similar data packet definition, it may become necessary to communicate a command in the memory system of FIG. 8 using multiple data packets. This possibility is further illustrated in FIGS. 9A and 9B. Here, related first and second data packets are separately communicated during different time frames in order to fully implement a memory system command from memory controller 110' to memory 210'. The first data packet shown in FIG. 9A includes command data (e.g., /CS, /RAS, /CAS, /WE and /AWE), address data (e.g., R0-R12 and C0-C12), and don't care data ("X"). The second data packet shown in FIG. 9B includes write data (e.g., D0-D32), and don't care data ("X").

Each of the first and second data packets indicates its nature by also including a first transmitted data/command bit (DC). This bit identifies the data packet as either containing command/address data or containing write data. In response to the data/command bit, packet receiver 22' in memory 210' knows how to handle the constituent data. For example, in the embodiment of FIG. 8, packet receiver 22' is assumed to sequentially receive the first and second data packets illustrated in FIGS. 9A and 9B. In response to the data/command bit apparent in the first data packet, packet receiver 22' generates the internal command (com) and internal address (add).

Subsequently (or previously), when packet receiver 22' receives the second data packet it generates internal write data (wd). The internal write data (wd) is communicated from packet receiver 24' to a write data buffer 28' (DB) where it is temporarily stored.

Figure 9B:

However, the embodiment illustrated in FIGS. 8, 9A, and 9B makes use of the additional write enable bit (/AWE) to generate a set of commands including one or write commands having a minimum Hamming distance value greater than 1 with respect to each of the non-write commands in the set of memory system commands. A command data decoder such as the one shown in FIG. 10 may be used to generate the exemplary command set assumed in the memory systems of FIGS.

Figure 10:
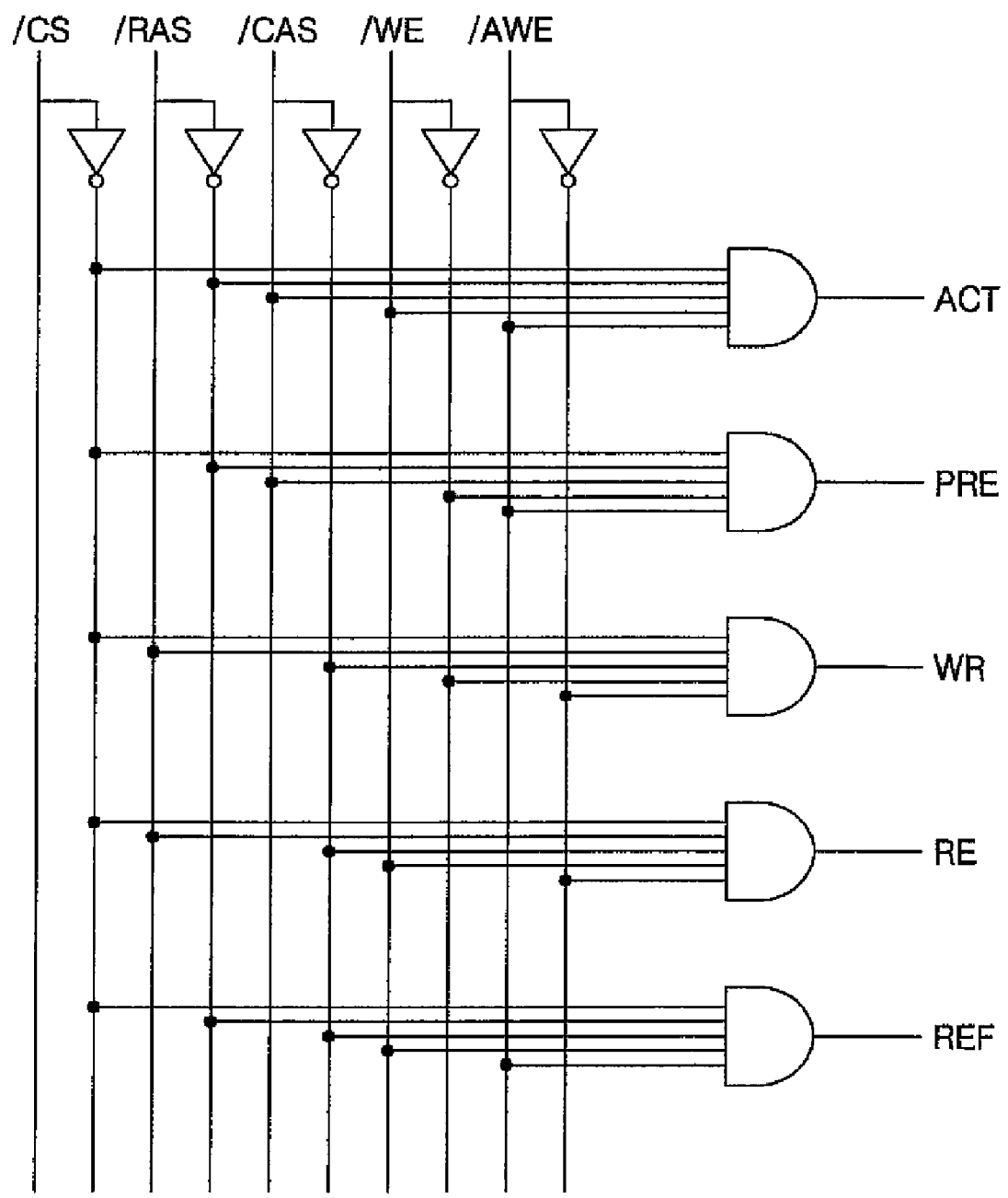
FIG. 10 illustrates an exemplary decoder circuit adapted for use within the memory systems shown in FIGS. 6 and 8.

6 and 8. In FIG. 10, a competent command data decoder may be implemented using a collection of inverters and AND gates connected in a logic matrix.

The foregoing embodiments have been presented in a description that highlights certain functions and capabilities apparent in various memory controller and memory designs. The individual circuits identified in the foregoing embodiments in relation to these functions and capabilities should not be construed in an overly literal sense. Those of ordinary skill in the art will recognize that the functions and capabilities may be implemented in a great variety of different circuit combinations. So combinations and/or partitions of the exemplary circuits discussed above may be made. Alternately, software may be used to implement one or more of these functions and capabilities. Whether implemented in hardware and/or software, and whether implementing a packetized or non-packetized data communication arrangement, the memory may be generally said to include a decoding/execution block capable of receiving a memory system command, decoding the command, and executing the command in relation to one or more constituent memory cores.

Indeed, one or more controller(s), microprocessor(s), or Application Specific Integrated Circuits (ASICs) and related software may be used to implement the functions and capabilities ascribed to one or more of the circuits described above in the context of FIGS. 6 and 8. For example, the functionality of packet receiver 22 or 22' might be combined with command decoder 24 within a single computational platform controlled by software. Packet receiver 22/22' may subsume the functionality of an internal clock generator and a competent error detector/correction circuit. Write data buffer 28/28' and read data buffer 30 might be implemented in a single integrated memory circuit. In sum, specific circuit definition(s) will follow from overall memory system design and data packet definition.

Up to this point in the description, the exemplary embodiments have assumed a memory capable of being implemented in a single integrated circuit (IC), (e.g., a DRAM, SRAM, or flash memory). However, embodiments of the invention are by no means limited to single IC memory implementations, or implementations where one memory controller is matched with only one unitary memory device.

Figure 11:
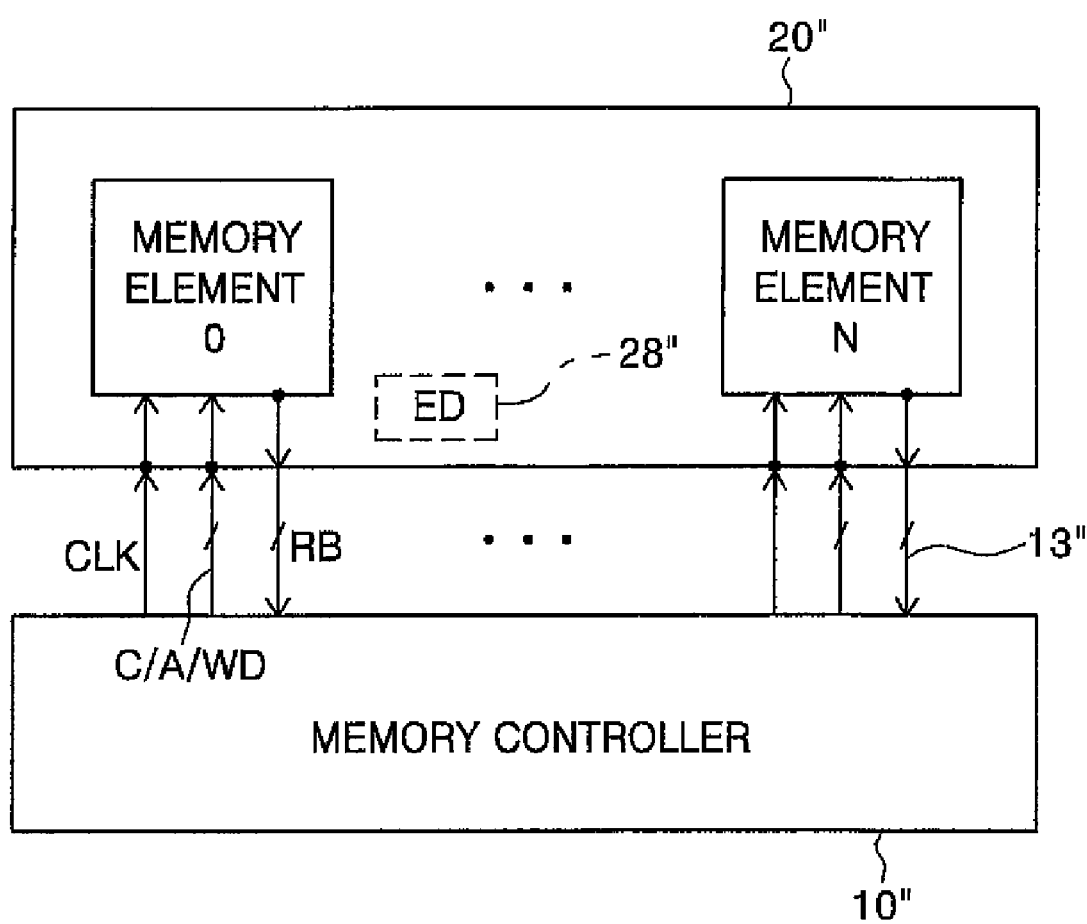
FIG. 11 illustrates another type of memory system susceptible to the advantages of a memory system command protocol consistent with an embodiment of the invention.

As described above, one important driver in the design and implementation of contemporary memory systems is size. The memory system of FIG. 11 comprises a memory controller 10" arranged with a corresponding memory 20" (e.g., a memory card or similar device) including multiple memory elements 0 through "N". Each memory element may include one or more volatile or nonvolatile memories. For example, in one embodiment, each memory element comprises a vertically stacked arrangement of individual memories.

Memory controller 10" is connected to memory 20" via channel 13" which includes a number of high-speed point-to-point interconnections. Such high-speed point-to-point interconnections are highly susceptible to variances in the length of their constituent signal lines. Thus, extended lateral arrangements of memory elements are difficult to implement. However, vertically stacked arrangements of memory elements allow relatively short point-to-point interconnections between memory controller 10" and memory 20". Further vertical interconnections between stacked memories in each memory element may be configured according to conventionally understood techniques. For example, in one embodiment, a lowermost memory element may route (or re-drive) received packets to other memories in the stack in accordance with a received address. Each memory element may include its own error detector, or a commonly accessed (and potentially more powerful) error detector 28" may be provided on memory 20".

In another embodiment of the invention, a smart card may be implemented as a "memory" associated with a smart card terminal acting as a "memory controller" within the vernacular of the foregoing description. That is, commands communicated from the smart card terminal to the smart card may be handled in a manner consistent with the foregoing embodiments.

Indeed, many products incorporating contemporary and emerging memory systems will benefit from a memory system command protocol that provides a reduced possibility of non-write operations being errantly communicated and/or erroneously interpreted and executed as write operations. Indeed, this improved immunity to data error is not limited to only a distinction between write and non-write commands. Minimum Hamming distance values may be established in a set of memory system commands between any type of critical command and other commands deemed less critical in their execution.

When a memory system command protocol according to an embodiment of the invention is used, it may be possible to eliminate the need for a DEC capability within the memory system. Alternately, an existing EDC capability may be used with greater reliability. Alternately, a memory system might be provisioned with a less capable (smaller and more streamed-lined in operation) EDC capability while retaining an acceptable level of error immunity.

It should be noted that while the invention has been taught in the context of selected embodiments and detailed examples teaching the making and use of the invention, the invention is not limited to only the disclosed embodiments. Those of ordinary skill in the art will recognize that various modifications and alterations may be made to these embodiments without departing from the scope of the invention as defined by the following claims.

What is claimed:

1. A memory system comprising:
a memory controller communicating a command to a memory, the command being selected from a set of all commands that are executable within the memory system, wherein the set of all commands includes a plurality of write commands and a plurality of non-write commands, and a Hamming distance value calculated between a respective digital value indicating each and every one of the plurality of write commands in the set of all commands and a respective digital value indicating each and every one of the plurality of non-write commands in the set of all commands is greater than 1.

2. The memory system of claim 1, wherein each and every command in the set of all commands is uniquely indicated by respective command data, and the command data comprises a plurality of write enable bits.

3. The memory system of claim 1, wherein the memory controller communicates the command to the memory as a command packet comprising control data and address data, and the memory comprises a packet receiver receiving the command packet and generating an internal command in relation to the control data and an internal address in relation to the address data.

4. The memory system of claim 3, wherein the command packet further comprises error detection/correction (EDC) data associated with at least one of the control data or the address data.

5. The memory system of claim 3, further comprising a unidirectional first bus communicating the command packet from the memory controller to the memory.

6. The memory system of claim 5, further comprising a unidirectional second bus communicating write data from the memory controller to the memory, and a unidirectional third bus communicating read data from the memory to the memory controller.

7. The memory system of claim 6, wherein the first bus has a different bus width than at least one of the second bus and the third bus.

8. The memory system of claim 5, further comprising a bidirectional second bus communicating write data and read data between the memory controller and memory.

9. The memory system of claim 8, wherein the first bus has a different bus width than the second bus.

10. The memory system of claim 3, further comprising:
a memory cell array comprising a plurality of memory cells;
a command decoder responsive to the internal command and generating a plurality of control signals applied to the memory cell array; and
an address decoder selecting at least one of the plurality of memory cells in response to the internal address.

11. The memory system of claim 10, wherein the memory cell array implements a Random Access Memory (RAM) and the plurality of control signals comprises a refresh signal, a precharge signal, a read enable signal, and a write enable signal.

12. The memory system of claim 10, wherein the memory cell array implements a nonvolatile memory and the plurality of control signals comprises a program-write signal, a read signal, an erase signal, and a verify signal.

13. The memory system of claim 3, further comprising:
a unidirectional first bus communicating the command packet from the memory controller to the packet receiver in the memory;
a unidirectional second bus communicating write data from the memory controller to a write data input buffer in the memory; and
a unidirectional third bus communicating read data from a read data output buffer in the memory to the memory controller.

14. The memory system of claim 3, wherein the command packet further comprises write data, and the packet receiver further generates internal write data from the write data.

15. The memory system of claim 14, further comprising:
a memory cell array comprising a plurality of memory cells;
a command decoder responsive to the internal command and generating a plurality of control signals applied to the memory cell array;
an address decoder selecting at least one of the plurality of memory cells in response to the internal address; and
a write data input buffer receiving the internal write data from the packet receiver.

16. The memory system of claim 15, further comprising:
a read data output buffer storing read data to be communicated from the memory to the memory controller.

17. A memory system comprising:
a memory controller connected to a plurality of memory elements arranged on a memory card via a plurality of point-to-point interfaces;
the memory controller communicating a command to at least one memory associated with at least one of the plurality of memory elements, the command being selected from a set of all commands that are executable within the memory system, wherein the set of all commands includes a plurality of write commands and a plurality of non-write commands, and a Hamming distance value calculated between a respective digital value indicating each and every one of the plurality of write commands in the set of all commands and a respective digital value indicating each and every one of the plurality of non-write commands in the set of all commands is greater than 1.

18. The memory system of claim 17, wherein at least one of the plurality of memory elements comprises a stacked arrangement of memories including the at least one memory.

19. The memory system of claim 18, wherein the at least one memory is a lowermost memory in the stacked arrangement of memories and the at least one memory is configured to re-drive the command to at least one other memory in the stacked arrangement of memories.

20. The memory system of claim 17, wherein the plurality of point-to-point interfaces comprises a first unidirectional bus communicating the command from the memory controller to the memory, and a second bus communicating at least one of write data or read data.

21. A method controlling operation of a memory within a memory system, the method comprising:
selecting a command from a set of all commands that are executable within the memory system, the set of all commands comprising a plurality of write commands and a plurality of non-write commands, and
communicating the selected command to the memory, wherein a Hamming distance value calculated between a respective digital value indicating each and every one of the plurality of write commands in the set of all commands and a respective digital value indicating each and every one of the plurality of non-write commands in the set of all commands is greater than 1.

22. The method of claim 21, wherein each and every command in the set of commands is uniquely indicated by control data, and the control data comprises a plurality of write enable bits.

23. The method of claim 22, wherein selection of the command is performed in a memory controller connected to the memory, and the command is communicated from the memory controller to the memory as a command packet comprising control data and address data, and the method further comprises:
receiving the command packet in the memory and generating an internal command in relation to the control data, and an internal address in relation to the address data.

24. The method of claim 23, wherein the command packet further comprises error detection/correction (EDC) data associated with at least one of the control data or the address data.

25. The method of claim 23, further comprising:
generating and applying a plurality of control signals to a memory cell array comprising a plurality of memory cells in response to the internal command; and
selecting at least one of the plurality of memory cells in response to the internal address.

26. The method of claim 25, wherein the memory cell array implements a Random Access Memory (RAM) and the plurality of control signals comprises a refresh signal, a precharge signal, a read enable signal, and a write enable signal.

27. The method of claim 25, wherein the memory cell array implements a nonvolatile memory and the plurality of control signals comprises a program-write signal, a read signal, an erase signal, and a verify signal.

28. The memory of claim 23, wherein the command packet further comprises write data, and the method further comprises generating internal write data in relation to the write data.

29. The method of claim 28, further comprising:
generating and applying a plurality of control signals to the memory cell array comprising a plurality of memory cells in response to the internal command;
selecting at least one of the plurality of memory cells in response to the internal address; and
storing the internal write data in a write data input buffer.

30. The method of claim 29, further comprising:
storing read data to be communicated from the memory to the memory controller in response to the command in a read data output buffer.

31. The method of claim 21, wherein the memory comprises a plurality of memories arranged on a memory card.

32. The method of claim 31, wherein the plurality of memories are arranged in at least one stacked arrangement on the memory card.

* * * * *